United States Patent
Nagai et al.

(10) Patent No.: US 7,897,672 B2
(45) Date of Patent: Mar. 1, 2011

(54) PROCESS FOR PRODUCING POLYOXYMETHYLENE COPOLYMER

(75) Inventors: Satoshi Nagai, Yokkaichi (JP); Akira Okamura, Yokkaichi (JP); Daisuke Sunaga, Yokkaichi (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 581 days.

(21) Appl. No.: 11/918,425

(22) PCT Filed: Apr. 10, 2006

(86) PCT No.: PCT/JP2006/307591

§ 371 (c)(1),
(2), (4) Date: Nov. 8, 2007

(87) PCT Pub. No.: WO2006/109780

PCT Pub. Date: Oct. 19, 2006

(65) Prior Publication Data

US 2009/0062503 A1    Mar. 5, 2009

(30) Foreign Application Priority Data

Apr. 12, 2005    (JP) .............................. 2005-114305

(51) Int. Cl.
*C08J 3/02*    (2006.01)
*C08K 5/07*    (2006.01)
*C08G 12/00*    (2006.01)
*C08G 12/02*    (2006.01)

(52) U.S. Cl. ................ 524/354; 528/243; 528/265; 528/422; 528/425; 528/480; 528/501; 528/502 R; 528/503; 525/328.7; 525/540

(58) Field of Classification Search ................ 528/243, 528/422, 425, 480, 501, 502 R, 503, 265; 524/354; 525/328.7, 540

See application file for complete search history.

(56) References Cited

FOREIGN PATENT DOCUMENTS

| JP | 2005-272707 | | 10/2005 |
| JP | 2006-057047 | * | 2/2006 |
| JP | 2006-057047 | | 3/2006 |
| WO | 96/23825 | | 8/1996 |

* cited by examiner

*Primary Examiner*—Duc Truong
(74) *Attorney, Agent, or Firm*—Wenderoth, Lind & Ponack, L.L.P.

(57) ABSTRACT

The problem to be solved is to provide a process for producing a polyoxymethylene copolymer in a molding machine with a reduced generation of formaldehyde gas. In a process for continuously producing a polyoxymethylene copolymer comprising a step of melt-kneading a crude polyoxymethylene copolymer at a temperature not lower than the melting point thereof, devolatilizing under reduced pressure the formaldehyde gas generated as a decomposition product, subsequently mixing a formaldehyde scavenger containing a hydrazide compound (A) while keeping the copolymer in a molten state and immediately pelletizing the mixture, a dispersed solution obtained by slurry-dispersing said (A) in a diluent (B) having a melting point lower than temperature (Ta) which is the lower of the melting point and the decomposition temperature of (A), within a temperature range not lower than the melting point of (B) and lower than (Ta) is used as the formaldehyde scavenger.

7 Claims, No Drawings

PROCESS FOR PRODUCING POLYOXYMETHYLENE COPOLYMER

TECHNICAL FIELD

This invention relates to a process for producing a polyoxymethylene copolymer that is excellent in thermal stability and can suppress generation of formaldehyde from pellets and molded products thereof.

BACKGROUND ART

Polyoxymethylene copolymers have excellent properties including mechanical properties, thermal properties, electric properties, sliding properties and molding properties and hence can find a broad scope of applications as structure materials and structure parts in the field of electric appliances, automobile parts, and precision machine parts. Particularly, the scope of applications of such resin materials has been broadened remarkably further in recent years. Then, by turn they are required to show better performances at lower cost as well as higher properties.

One of the serious problems from the viewpoint of the quality requirements of polyoxymethylene copolymers is that formaldehyde gas is generated during a polyoxymethylene copolymer molding process as the polyoxymethylene copolymer is thermally decomposed in the molding machine. Formaldehyde gas can adversely affect the human health, giving rise to a so-called sick house syndrome and other health problems. The ministry of Health, labor and welfare of Japan issued a guideline for the indoor formaldehyde concentration to be 0.08 ppm as a countermeasure against the sick house syndrome. Thus, final products of polyoxymethylene copolymer are required to produce formaldehyde only to a minimal level. Various processes for producing polyoxymethylene copolymers that produce formaldehyde gas only minimally have been proposed to date. They include, for example, a method of polymerizing monomers containing impurities only to a reduced level and rapidly cooling the produced polymer immediately after the polymerization to inactivate the catalyst and suppress any side reaction (Patent Document 1), a method of directly adding water to the extruder for terminal stabilization (Patent Document 2) and a method of polymerizing monomers to which sterically hindered phenol is added, subsequently inactivating the catalyst by controlling the polyoxymethylene copolymer after the polymerization to an optimum particle size, adding water and then devolatilizing the molten product under reduced pressure for terminal stabilization (Patent Document 3).

While polyoxymethylene copolymers showing a high yield of polymerization not less than 95% in particular are advantageous from the viewpoint of productivity and economy, they produce a number of thermally instable structures during the polymerization process so that the product is thermally unstable and can generate formaldehyde to a large extent in the molding machine. While it is possible to suppress the generation of formaldehyde in the molding machine by reducing the yield of polymerization, a reduction of yield of polymerization not only lowers the productivity but also gives rise to cost of collecting monomers to a great economic disadvantage. Thus, currently it is not possible to improve the thermal stability of polyoxymethylene copolymers containing a large number of thermally instable structures by means of any of the above listed thermally stabilizing methods.

Popularly known techniques for suppressing the decomposition of polyoxymethylene copolymers by means of one or more than one additives include those of adding one or more than one sterically hindered amine compounds or sterically hindered amine compounds as antioxidants and one or more than one polyamides, urea derivatives and/or hydroxides of any of alkali or alkaline-earth metals as thermal stabilizers. However, no satisfactory results can be obtained in terms of decomposition stability when the thermal stability of the polyoxymethylene copolymer itself is poor. Additionally, the use of additives to a large extent is economically disadvantageous.

Techniques of adding various compounds having reactivity with formaldehyde are known for the purpose of suppressing the generation of formaldehyde from pellets and molded products of polyoxymethylene copolymer. For example, hydrazide compounds are known to be highly reactive with formaldehyde and effective for immobilizing formaldehyde (Patent Document 4). However, the above-cited Patent Document describes only the reactivity of general hydrazide compounds with formaldehyde and does not describe about means for efficiently obtaining a polyoxymethylene copolymer with a reduced degree of formaldehyde generation.

Other known techniques of using a hydrazide compound as a formaldehyde scavenger include a method of compounding a borate of a nitrogen-containing compound such as hydrazide (Patent Document 5), a method of using 1,2,3,4-hydrazide butanetetracarboxylate that is a novel compound operating as a formaldehyde adsorbent (Patent Document 6) and a method of compounding a hydrazide compound and urea or a urea derivative to a specific ratio (Patent Document 7). However, any of these techniques are unsatisfactory for effectively suppressing the generation of formaldehyde and/or accompanied by a problem of degrading the physical properties of molded products of polyoxymethylene copolymer.

The inventors of the present invention found in the past that a polyacetal resin composition that contains a hydrazide compound and an amine-substituted triazine compound to specific respective ratios can effectively suppress the generation of formaldehyde from pellets and molded products of polyoxymethylene copolymer (Patent Document 8). However, the process using such a composition requires a large number of extrusion steps and hence there is a strong demand for a method of economically producing a polyoxymethylene copolymer that generates formaldehyde only at a low rate with a smaller number of extrusion steps.

Patent Document 1: Jpn. Pat. Appln. Laid-Open Publication No. 5-247158

Patent Document 2: Jpn. Pat. Appln. Laid-Open Publication No. 7-233230

Patent Document 3: Jpn. Pat. Appln. Laid-Open Publication No. 10-168144

Patent Document 4: Jpn. Pat. Appln. Laid-Open Publication No. 04-345648

Patent Document 5: Jpn. Pat. Appln. Laid-Open Publication No. 10-086630

Patent Document 6: Jpn. Pat. Appln. Laid-Open Publication No. 06-080619

Patent Document 7: Jpn. Pat. Appln. Laid-Open Publication No. 2002-035098

Patent Document 8: Jpn. Pat. Appln. No. 2005-267414

DISCLOSURE OF THE INVENTION

Problem to be Solved by the Invention

Therefore, the object of the present invention is to provide a method of efficiently and economically producing a polyoxymethylene copolymer that can suppress generation of formaldehyde at the time of molding.

Means for Solving the Problem

As a result of intensive research efforts, the inventors of the present invention came to find a method of efficiently producing a polyoxymethylene copolymer in a molding machine with a reduced generation of formaldehyde gas by slurry-dispersing a hydrazide compound in a diluent when melting and mixing the hydrazide compound with the polyoxymethylene copolymer. The present invention is based on this finding.

Thus, the present invention relates to a process for producing a polyoxymethylene copolymer as defined in (1) through (6) below.

(1) A process for continuously producing a polyoxymethylene copolymer comprising a step of melt-kneading a crude polyoxymethylene copolymer at a temperature not lower than the melting point thereof, devolatilizing under reduced pressure the formaldehyde gas generated as a decomposition product, subsequently mixing a formaldehyde scavenger containing a hydrazide compound (A) while keeping the copolymer in a molten state and immediately pelletizing the mixture, characterized in that said formaldehyde scavenger is a dispersed solution obtained by slurry-dispersing said (A) in a diluent (B) having a melting point lower than temperature (Ta) within a temperature range not lower than the melting point of (B) and lower than (Ta), wherein said (Ta) is the lower one of the melting point and the decomposition temperature of (A).

(2) The process for producing a polyoxymethylene copolymer as defined in (1) above, characterized in that a horizontal self-cleaning type biaxial kneader is employed for the step of devolatilizing under reduced pressure and devolatilization is conducted for 15 to 60 minutes.

(3) The process for producing a polyoxymethylene copolymer as defined in (1) above, characterized in that the hydrazide compound (A) is a dihydrazide compound.

(4) The process for producing a polyoxymethylene copolymer as defined in (3) above, characterized in that the dihydrazide compound is at least a compound selected from a group consisting of adipoyl dihydrazide, sebacic dihydrazide, dodecanedioic acid dihydrazide, 1,18-octadecanedicarbohydrazide, terephthalic acid dihydrazide, 1,8-naphthalene dicarbohydrazide and 2,6-naphthalene dicarbohydrazide.

(5) The process for producing a polyoxymethylene copolymer as defined in (1) above, characterized in that the diluent (B) is polyethylene glycol.

(6) The process for producing a polyoxymethylene copolymer as defined in (5) above, characterized in that the diluent (B) is polyethylene glycol having a molecular weight between 1,000 and 50,000 as determined from the hydroxy value.

(7) The process for producing a polyoxymethylene copolymer as defined in (1) above, characterized in that the concentration of the hydrazide compound in the dispersed solution is between 5 and 70 wt %.

Advantages of the Invention

Thus, with a process for producing a polyoxymethylene copolymer according to the present invention, a crude polyoxymethylene copolymer (a polyoxymethylene copolymer subjected to a process of deactivating the catalyst after polymerization) is melt-kneaded at a temperature not lower than the melting point thereof and the formaldehyde gas generated by decomposition is sufficiently devolatilized under reduced pressure, and subsequently, while keeping the molten state thereof, a dispersed solution obtained by slurry-dispersing the hydrazide compound in a specific diluent is mixed as a formaldehyde scavenger with the polyoxymethylene copolymer, and the mixture is immediately pelletized. Therefore, it is possible to minimize the wasteful loss of the hydrazide compound and the amount of addition thereof can be optimized by using a very small quantity. Then, it is possible to suppress the generation of formaldehyde in the molding process and to efficiently and economically produce a polyoxymethylene copolymer that is substantially free from any mold deposit.

BEST MODE FOR CARRYING OUT THE INVENTION

A mass polymerization process may be used for the polymerization process for producing a polyoxymethylene copolymer according to the present invention. It is a polymerization process using monomers in a molten state. As polymerization progresses, a massive or powdered solid polymer is obtained.

The starting monomer of the present invention is trioxane that is a cyclic trimer of formaldehyde and cyclic formals and/or cyclic ethers are used as a comonomer.

Examples of cyclic formals that can be used for the purpose of the present invention include 1,3-dioxolane, 2-ethyl-1,3-dioxolane, 2-propyl-1,3-dioxolane, 2-butyl-1,3-dioxolane, 2,2-dimethyl-1,3-dioxolane, 2-phenyl-2-methyl-1,3-dioxolane, 4-methyl-1,3-dioxolane, 2,4-dimethyl-1,3-dioxolane, 2-ethyl-4-methyl-1,3-dioxolane, 4,4-dimethyl-1,3-dioxolane, 4,5-dimethyl-1,3-dioxolane, 2,2,4-trimethyl-1,3-dioxolane, 4-hydroxymethyl-1,3-dioxolane, 4-butyloxymethyl-1,3-dioxolane, 4-phenoxymethyl-1,3-dioxolane, 4-chloromethyl-1,3-dioxolane and 1,3-dioxabicyclo[3,4,0]nonane. Examples of cyclic ethers that can be used for the purpose of the present invention include ethylene oxide, propylene oxide, butylene oxide, epichlorohydrin, styrene oxide, oxetane, 3,3-bis(chloromethyl)oxetane, tetrahydrofuran and oxepane, of which 1,3-dioxolane is particularly preferable.

The amount of addition of the comonomer is preferably between 0.5 to 40.0 mol %, more preferably between 1.1 and 20.0 mol % based upon the total amount of trioxane. The polymerization yield falls when the rate of addition of the comonomer is higher than the above-defined range, whereas the thermal stability of the product can be degraded when the rate of addition of the comonomer is lower than the above-defined range.

One or more than one compounds selected from polyfunctional epoxy type compounds and/or polyfunctional glycidyl ether type compounds such as 1,4-butanediol diglycidyl ether and polyethylene glycol diglycidyl ether may be added to the trioxane by 0.001 to 0.2 wt % as a crosslinking/branching agent.

Commonly used cationic active catalysts can be used as a polymerization catalyst for the purpose of the present invention. Examples of such cationic active catalysts include Lewis acids, particularly halides of boron, tin, titanium, phosphorus arsenic and antimony such as boron trifluoride, tin tetrachloride, titanium tetrachloride, phosphorus pentachloride, phosphorus pentafluoride, arsenic pentafluoride and antimony pentafluoride, complex compounds thereof, salts thereof, protonic acids such as trifluoromethanesulfonic acid, perchloric acid, esters of protonic acids, particularly esters of perchloric acid and lower aliphatic alcohols, protonic acid anhydrides, particularly mixtures of anhydrides of perchloric acids and lower aliphatic carboxylic acids, triethyl oxonium hexafluorophosphate, triphenyl methylhexafluoroarsenate, acetylhexafluoroborate, heteropoly acids, acid salts thereof, isopoly acids and acid salts thereof. Particularly, compounds containing boron trifluoride, hydrate of boron trifluoride and coordinated complexes are preferable. More particularly, boron trifluoride diethyletherate and boron trifluoride dibutyletherate that are coordinated complexes of ethers are preferable.

The ratio of the catalyst based upon trioxane is normally between $1 \times 10^{-7}$ and $1 \times 10^{-3}$ mols, preferably between $1 \times 10^{-7}$ and $1 \times 10^{-4}$ mols based upon 1 mol of trioxane. The thermal stability is degraded when the ratio of the catalyst is higher than the above range, whereas the polymerization yield falls when the ratio is lower than the above range.

If necessary, an appropriate molecular weight adjusting agent may be used with the polymerization method of the present invention in order to adjust the molecular weight of the polyoxymethylene copolymer. Examples of molecular weight adjusting agents that can be used for the purpose of the present invention include carboxylic acids, carboxylic acid anhydrides, esters, amides, imides, phenols and acetal compounds. Particularly, phenols, 2,6-dimethylphenol, methylal and polyoxymethylenedimethoxides are preferable. Of the above listed compounds, methylal is most preferable. The molecular weight adjusting agent is used independently or in the form of solution. When it is used in the form of solution, solvents that can be used for the solution include aliphatic hydrocarbons such as hexane, heptane and cyclohexane, aromatic hydrocarbons such as benzene, toluene and xylene and halogenated hydrocarbons such as methylene dichloride and ethylene dichloride.

Generally, the amount of addition of such molecular weight adjusting agents is regulated within a range of 0 to $1 \times 10^4$ ppm based upon the amount of trioxane depending on the intended molecular weight.

The molecular weight adjusting agent is supplied to the starting mixture solution of trioxane and the comonomer. While there are no particular limitations to the position of addition, the agent is preferably supplied to the starting mixture solution before the cation-active catalyst is supplied to the solution.

Continuous polymerization apparatus that can be used for the purpose of the present invention include any continuous trioxane polymerization apparatus proposed to date such as kneaders, biaxial screw type continuous extrusion/kneading apparatus, biaxial paddle type continuous mixers and other apparatus having a strong agitation power that can handle the rapid solidification/heat emission appearing at the time of polymerization, a delicate temperature regulation ability and a self-cleaning function for preventing scales from adhering. Polymerization apparatus of two or more different types may be combined for use. Of the above-listed apparatus, the use of a continuous horizontal reactor having pair of shafts that are driven to rotate in the same sense wherein each shaft has a number of convex lens type or pseudo-triangle type paddles that can mutually engage are embedded is preferable. Two or more continuous horizontal reactors may be connected in series for use.

As for the time of polymerization, the duration of 3 to 120 minutes, preferably 5 to 60 minutes, is selected for the polymerization. Both the polymerization yield and the thermal stability are reduced when the time of polymerization is shorter than the above duration and the productivity is degraded when the time of polymerization is longer than the above duration.

According to the present invention, a crude polyoxymethylene copolymer is obtained by immediately mixing the polyoxymethylene copolymer that is discharged from the polymerization apparatus after the end of the polymerization process with the catalyst deactivating agent in order to bring them into contact with each other for a deactivation process of the polymerization catalyst.

The time of introducing the catalyst deactivating agent is determined according to the polymerization yield. It is preferable from the viewpoint of economy and productivity to deactivate the catalyst and stop the polymerization process when the polymerization yield gets to not less than 95%, preferably not less than 97%.

For measuring the polymerization yield, 20 g of the crude polyoxymethylene copolymer is immersed into 20 ml of acetone for 30 minutes, subsequently filtered and washed with acetone for three times and then vacuum-dried at 60° C. to remove the unreacted monomer until the amount thereof becomes stabilized. Then, the polymerization yield can be determined by dividing the accurately measured weight of the refined polyoxymethylene copolymer by the weight of the crude polyoxymethylene copolymer.

Catalyst deactivating agents that can be used for the purpose of the present invention include trivalent organic phosphorus compounds, organic amine type compounds and hydroxides of alkali metals and alkaline earth metals.

Organic amine type compounds that can be used as a catalyst deactivating agent include primary, secondary and tertiary aliphatic amines and aromatic amines, heterocyclic amines and hindered amines. Specific examples of organic amine type compounds include ethyl amine, diethyl amine, triethyl amine, mono-n-butyl amine, di-n-butyl amine, tripropyl amine, tri-n-butyl amine, N,N-butyldimethylamine, aniline, diphenylamine, pyridine, piperidine, morpholine, melamine and methylol melamine.

Trivalent organic phosphorus compounds include triphenyl phosphine, ethyltetramethylene phosphine, n-butyl dimethyl phosphine, triethyl phosphine, ethylpentamethylene phosphine, dimethylphenylphosphine, methylethyl-n-pentylphosphine, diethylbutylphosphine, tri-n-butylphosphine, methyldiphenylphosphine, ethyl-n-pentylphenylphosphine, methylbenzylphenylphosphine, ethyldiphenylphosphine, ethyl-n-hexylphenylphosphine, benzyl-n-butyl-n-propylphosphine, ethyldicyclohexylphosphine, isopropyldiphenylphosphine, ethylbenzylphenylphosphine, dibenzylethylphosphine, n-butylphenylphosphine, n-propylbenzylphenylphosphine, n-butylbenzylphenylphosphine, triphenylphosphine, cyclohexyldiphenylphosphine, dibenzyl-n-butylphosphine, dicyclohexylphenylphosphine, tricyclohexylphosphine, diphenylbenzylphosphine, dibenzylphenylphosphine, tribenzylphosphine, ethyl dipropyl phosphinate, ethyl butylethyl phosphinate, ethyl methylphenyl phosphinate, ethyl ethylphenyl phosphinate, ethyl dibutyl phosphinate, methyl diphenyl phosphinate, ethyl diphenyl phosphinate, phenyl diphenyl phosphinate, phenyl dibenzyl phosphinate, dimethyl ethyl phosphonate, diethyl ethyl phosphonate, dephenyl ethyl phosphonate, diethyl propyl phosphonate, diethyl butyl phosphonate, diethyl phenyl phosphonate, dimethyl phenyl phosphonate, diethyl benzyl phosphonate, trimethyl phosphite, triethyl phosphite, tri-n- propyl phosphite, tri-isopropyl phosphite, tri-n-butyl phosphite, triphenyl phosphite, tricyclohexyl phosphite, tribenzyl phosphite, tritolyl phosphite, β-naphthyl phosphite, tridecyl phosphite, tirnonylphenyl phosphite and tristearyl trithio phosphite, of which triphenyl phosphine is preferable.

Of the above listed catalyst deactivating agents, trivalent organic phosphorus compounds and tertiary amines that are thermally stable can preferably be used for the purpose of the present invention. Among the trivalent organic phosphorus compounds, particularly preferable is triphenyl phosphine which is thermally stable and does not exert any adverse coloring effect on the molded products due to heat. A problem can arise when a tertiary amine is selected as a catalyst deactivating agent, i.e., unreacted tertiary amine is left unremoved after the step of devolatilization under reduced pressure conducted at a temperature not lower than the temperature of the melting point of the crude polyoxymethylene copolymer for 20 minutes or more as will be described in more detail hereinafter. When unreacted tertiary amine is left unremoved in the product, the molded product can become colored due to oxidation of amine that can arise during the molding process. Thus, tertiary amine compounds that can preferably be used for the purpose of the present invention are such that any unreacted amine remaining after the process of devolatilization under reduced pressure can be removed from the produced polyoxymethylene copolymer, that is, having a boiling point lower than the temperature of devolatilization under reduced pressure by about 100° C. Specific examples of such amines include triethyl amine (boiling point: 89° C.) and N,N-butyldimethylamine (boiling point: 93° C.).

It is not necessary to input the catalyst deactivating agent by the amount sufficient for completely deactivating the catalyst. In other words, it is only necessary to suppress the fall of the molecular weight of the produced crude polyoxymethylene copolymer to the permissible range for the product during the time from the deactivating process to the finishing process of the product. Normally, the catalyst deactivating agent is used by a number of moles that is 0.01 to 500 times, preferably 0.05 to 100 times, of the mols of the employed catalyst.

When the catalyst deactivating agent is employed in the form of solution or suspension, the solvent to be used is not subjected to any limitations. Examples of solvents that can be used for the purpose of the present invention include water, alcohols, starting monomers and aliphatic and aromatic various organic solvents and such as cyclic formals/ethers, acetone, methylethyl ketone, hexane, cyclohexane, heptane, benzene, toluene, xylene, methylene dichloride and ethylene dichloride and mixture solvents thereof.

In the catalyst deactivating process according to the present invention, the polyoxymethylene copolymer to be subjected to the process is preferably in the form of powdery fine particles and the copolymerization apparatus preferably has a function of sufficiently crushing massive polymers. After the polymerization and adding the catalyst deactivating agent to the polyoxymethylene copolymer, the polyoxymethylene copolymer may be crushed in a crusher. Alternatively, the catalyst deactivating agent may be added after crushing the polyoxymethylene copolymer in a crusher. Still alternatively, the polyoxymethylene copolymer may be crushed and agitated at the same time in the presence of the catalyst deactivating agent. If the crude polyoxymethylene copolymer is not in the form of powdery fine particles after the catalyst deactivating process, the catalyst contained in the resin may not be deactivated satisfactorily. Then, depolymerization may gradually progress due to the remaining active catalyst to reduce the molecular weight of the polyoxymethylene copolymer. When the catalyst deactivation is imperfect and reduction of the molecular weight is expected to take place, a technique of regulating the molecular weight of the finished product is employed by adjusting the amount of the molecular weight adjusting agent added in consideration of reduction of molecular weight in advance, in order to raise the molecular weight of the crude polyoxymethylene copolymer.

The thermally instable structures of the crude polyoxymethylene copolymer are decomposed and removed as the crude copolymer is melt-kneaded continuously at a temperature not lower than the melting point and the generated formaldehyde gas is decompressed/devolatilized. The thermally instable structures of the crude polyoxymethylene copolymer may include hemiformal terminals of the polyoxymethylene copolymer. Hemiformal terminals give rise to depolymerization in a zipper-like manner, emitting formaldehyde by heating. In the process of decomposing/removing thermally instable structures, depolymerization is ideally intentionally produced until the terminals reach to (thermally stable) alkylene units in the comonomer to make them thermally stable. The formic acid that is generated as formaldehyde is oxidized becomes formate terminals as a result of a chain transfer reaction that takes place in the polymerization reaction. While the formate terminals are thermally stable, they are liable to be subjected to alkali hydrolysis. Once they are decomposed, hemiformal terminals become exposed to reduce the thermal stability of the product. In the process of decomposing and removing the thermally instable structures, it is possible to stabilize the terminals by depolymerization, while intentionally adding an alkali aqueous solution to hydrolyze them.

The process of devolatilization under reduced pressure is conducted under pressure of $9.33 \times 10$ to $1.33 \times 10^{-3}$ kPa (absolute pressure here and hereinafter), while the polyoxymethylene copolymer is being melt-kneaded. The degree of decompression is preferably within a range between $6.67 \times 10$ and $1.33 \times 10^{-3}$ kPa, more preferably within a range between $2.67 \times 10$ and $1.33 \times 10^{-3}$ kPa, most preferably within a range between $1.33 \times 10$ and $1.33 \times 10^{-3}$ kPa.

The duration of devolatilization under reduced pressure is between 15 and 60 minutes, preferably between 20 and 40 minutes. It is not possible to achieve a satisfactory effect of suppressing the generation of formaldehyde gas during the molding process when the duration is shorter than above range, whereas undesirable results such as a degraded thermal stability, reduction of viscosity and yellowing due to decomposition of the main chain of the polymer when the duration is longer than the above range. It is also preferable to introduce inert gas such as nitrogen gas or alcohol or water that can be vaporized under the condition of devolatilization under reduced pressure in a pressure reducing device during the devolatilization under reduced pressure to avoid invasion of external air and/or to control the degree of decompression.

While the temperature of the step of devolatilization under reduced pressure is not subjected to any limitations so long as it is not lower than the melting point of the crude polyoxymethylene copolymer, it is preferably between 190 and 240° C. Unmolten polyoxymethylene copolymer can remain and the thermally instable structures can be insufficiently decomposed/removed when the temperature is low, whereas yellowing and a reduction of thermal stability due to thermal decomposition of the main chain of the polymer can take place when the temperature is high, both of which are not desirable.

The process of devolatilization under reduced pressure is preferably conducted in a continuous production type apparatus wherein an extruder provided with vents and having a single axis or two or more axes and a decompression/devolatilization processor are connected in series and the crude polyoxymethylene copolymer subjected to a catalyst deactivating process is molten in the extruder provided with vents and then introduced into the decompression/devolatilization processor for decompression/devolatilization for a predetermined time period.

A vertical or horizontal high viscosity type polymerizer can be used for the decompression/devolatilization processor. In the case where a vertical polymerizer is used, although the agitation blades are not subjected to any particular limitations, the use of high viscosity agitation blades that can uniformly mix molten polyoxymethylene copolymer is preferable. Examples of agitation blades that can suitably be used for the purpose of the present invention include ribbon blades, lattice blades, max blend blades, full zone blades and modified blades of any of them. Horizontal polymerizers that can suitably be used for the purpose of the present invention are preferably self-cleaning type horizontal polymerizers provided with agitation blades having a single axis or two or more axes and showing an excellent surface updating property. Examples of such polymerizers include the spectacle-shaped blade type and lattice-shaped blade type reactors available from Hitachi Ltd., the SCR and NSCR reactors available from Mitsubishi Heavy Industries, Ltd., the KRC kneader and the processor available from Kurimoto Ltd. and BIVOLAK available from Sumitomo Heavy Industries Ltd.

It is possible to add any of known antioxidants and/or thermal stabilizers collectively or separately to the polyoxymethylene copolymer as additives during the decompression/devolatilization process. While such additives are preferably added during the decompression/devolatilization process, they may be alternatively preliminarily mixed and added prior to the decompression/devolatilization process. A henschel mixer or the like may be used when such additives are added prior to the decompression/devolatilization process.

The additives that are not added by the end of the decompression/devolatilization process or the remain of the additives that are divided and added may be added after the decompression/devolatilization process. An extruder provided with vents having a single axis or two or more axes may be used when adding the additives after the decompression/devolatilization process.

Examples of oxidants that can be used for the purpose of the present invention include sterically hindered phenols such as 1,6-hexanediol-bis[3-(3,5-di-t-butyl-4-hydroxyphenyl)propionate], triethyleneglycol-bis-3-(3-t-butyl-4-hydroxy-5-methylphenyl)propionate, pentaerythrityl-tetrakis-3-(3,5-di-t-butyl-4-hydroxyphenyl)propionate, 2,2'-methylenebis(6-t-butyl-4-methylphenol), 3,9-bis{2-[3-(3-t-butyl-4-hydroxy-5-methylphenyl)proprionyloxy]-1,1-dimethylethyl}-2,4,8,10-tetraoxaspiro[5,5]undecane, N,N'-hexane-1,6-diyl-bis[3-(3,5-di-t-butyl-4-hydroxyphenyl)propionamide] and 3,5-bis (1,1-dimethylethyl)-4-hydroxybenzene-propanoic acid-1,6-hexane-diyl-ester. Any of such sterically hindered phenols is added preferably by 0.01 to 5.0 parts by weight, more preferably by 0.01 to 2.0 parts by weight based upon 100 parts by weight of the polyoxymethylene copolymer.

Examples of thermal stabilizers include amine-substituted triazines such as melamine, methylol melamine, benzoguanamine, cyanoguanidine and N,N-diarylmelamine, polyamides, urea derivatives, hydrazine derivatives and urethanes as well as salts of inorganic and organic acids containing sodium, potassium, calcium, magnesium and barium and hydroxides of such metals.

Any of such amine-substituted triazines is added preferably by 0.01 to 1.0 parts by weight based upon 100 parts by weight of the polyoxymethylene copolymer. It is not desirable to add such a triazine excessively because such an excessive dose obstructs the reactivity of the hydrazide compound and formaldehyde to be added subsequently.

If desired, additives selected from coloring agents, nucleation agents, plasticizers, fluorescent whitening agents, mold releasing agents of fatty acid ester type compounds such as pentaerythritol tetrastearate and silicon compounds, sliding agents, antistatic agents such as polyethylene glycol and glycerin, salts of higher fatty acids, ultraviolet absorbents such as benzotriazole type and benzophenone type compounds and/or light stabilizers such as hindered amine type compounds can be added to respective desired ratios in the polyoxymethylene copolymer produced by the method of the present invention.

A formaldehyde scavenger containing a hydrazide compound is then added to the obtained polyoxymethylene copolymer where thermally instable structures are decomposed and removed, while maintaining the molten state, and pelletized to form products. It is not desirable to add the hydrazide compound in a state where a large number of thermally instable structures remain or decomposed formaldehyde is left in the molten resin to a large extent because the hydrazide compound is wasted by formaldehyde to a large extent. Therefore, it is not desirable to blend the crude polyoxymethylene copolymer and the hydrazide compound in advance at the time of devolatilizing under reduced pressure.

It is a dispersed solution prepared by slurry-dispersing a hydrazide compound in a diluent that is added and compounded as a formaldehyde scavenger for the purpose of the present invention.

Either an aliphatic or aromatic hydrazide compound may be used as a hydrazide compound for the purpose of the present invention, and a single hydrazide compound or a mixture of two or more hydrazide compounds may be used. Examples of aliphatic hydrazide compounds include monohydrazide compounds such as propionic acid hydrazide and thiocarbohydrazide, dihydrazide compounds such as oxalic acid dihydrazide, malonic acid dihydrazide, succinic acid dihydrazide, glutaric acid dihydrazide, adipoyl dihydrazide, sebacic dihydrazide, dodecanedioic acid dihydrazide, 1,18-octadecanedicarbohydrazide, maleic acid dihydrazide, fumaric acid dihydrazide and 7,11-octadecanediene-1,18-dicarbohydrazide.

Examples of aromatic hydrazide compounds include hydrazides and dihydrazides such as salicylic acid hydrazide, terephthalic acid dihydrazide, 3-hydroxy-2-naphtoic acid hydrazide, p-toluenesulfonylhydrazide, aminobenzhydrazide, 4-pyridine carboxylic acid hydrazide, 1,5-naphthalene dicarbohydrazide, 1,8-naphthalene dicarbohydrazide, 2,6-naphthalene dicarbohydrazide, 4,4'-oxybisbenzenesulfonylhydrazide and 1,5-diphenylcarbonohydrazide. Any of polyhydrazides such as aminopolyacrylamides, 1,3,5-tris(2-hydrazinocarbonylethyl)isocyanurate may also be used for the purpose of the present invention.

Dihydrazide compounds can preferably be used for the purpose of the present invention out of the above listed hydrazide compounds. Particularly preferable dihydrazide compounds include adipoyl dihydrazide, sebacic dihydrazide, dodecanedioic acid dihydrazide, 1,18-octadecanedicarbohydrazide, terephthalic acid dihydrazide, 1,8-naphthalene dicarbohydrazide and 2,6-naphthalene dicarbohydrazide.

Generally, hydrazide compounds have a decomposition temperature. As a hydrazide compound is heated to a temperature level higher than the decomposition temperature, it becomes remarkably decomposed to lose its reactivity with formaldehyde. Therefore, it is preferable that the hydrazide compound to be added for the purpose of the present invention has a decomposition temperature that is higher than the process temperature of the process of mixing and kneading of the hydrazide compound with crude polyoxymethylene copolymer and the process of molding the polyoxymethylene copolymer. However, the inventors of the present invention have found that, even if the hydrazide compound has a high decomposition temperature, it usually becomes decomposed as it is heated above its melting point and eventually loses its reactivity with formaldehyde. In other words, when a hydrazide compound is wasted in a reaction with formaldehyde and/or itself is thermally decomposed and modified, it is necessary to use the hydrazide compound to a large extent in order to suppress generation of formaldehyde from the product. Therefore, it is preferable to add the hydrazide compound in a state wherein the formaldehyde concentration in the polyoxymethylene copolymer is reduced as much as possible by decomposing thermally instable structures and the temperature of the polyoxymethylene copolymer is lowered as much as possible on the occasion of addition, and subsequently to pelletize quickly and to cool the product.

When adding the hydrazide compound, it may be fed alone or with other additives in a powdery state. To add the hydrazide compound, an extruder provided with vents and having a single axis or two or more axes may be arranged downstream and connected in series to a processor of devolatilization under reduced pressure. However, such an arrangement involves extraordinary large cost and the gas that intrudes when adding the hydrazide compound needs to be devolatilized. While it is possible to heat the hydrazide compound above its melting point and melt it before adding to the reaction system, such heating is not desirable because the hydrazide compound gradually becomes decomposed and modified when it is heated to a high temperature level even if below its decomposition temperature so that a needed amount of hydrazide compound becomes large as pointed out above. Thus, the hydrazide compound is preferably added in the form of a dispersed solution obtained by slurry-dispersing (A) in a diluent having a melting point lower than temperature (Ta), which is the lower of the melting point and the decomposition temperature of said hydrazide compound, within a temperature range not lower than the melting point of the diluent and lower than (Ta). (A) may be slurried and dispersed by putting the diluent and the hydrazide compound into a drum equipped with an agitator and a heating function and mixing them inside to a uniform mixture or by continuously melting and mixing by means of an extruder. When adding into the system (in the polyoxymethylene copolymer producing process), the use of a pump suitable for transferring highly viscous and highly concentrated solution and slurry and also suitable for pressurization is preferable. Such a pump may be a gear pump or a mohno pump (available from HEISHIN Ltd.). While it is possible to melt and mix the hydrazide compound with pelletized polyoxymethylene copolymer by means of a monoaxial or biaxial extruder, such a process is economically disadvantageous compared with the method of the present invention.

The diluent for dispersing the hydrazide compound needs to be inactive with the polyoxymethylene copolymer and the other components existing in the reaction system and free from exerting any adverse effect on the properties of the polyoxymethylene copolymer. Examples of diluents include polymers such as polydioxolanes, polyalkylene glycols, polyethers, polyesters, polyethylenes and the derivatives thereof and various stabilizers (antioxidants, plasticizers and mold releasing agents) that are normally added to polyoxymethylene copolymers.

Examples of polyalkylene glycols include polyethylene glycol and polypropylene glycol. Examples of polyethylenes include HDPE, LDPE and polymerized and modified products thereof and copolymers of ethylene and acrylic acid ester or vinyl acetate.

Of the above-listed polyalkylene glycols, polyethylene glycol having a melting point as low as 60° C. is preferable. Preferably, the molecular weight thereof is selected by taking the viscosity of the dispersed solution after dispersing the hydrazide compound into consideration in order to achieve a good feeding effect. Thus, polyethylene glycol having a molecular weight preferably between 1,000 and 50,000, more preferably between 1,000 and 20,000, most preferably between 6,000 and 20,000, as determined from the hydroxy value can advantageously be used for the purpose of the present invention. The concentration of the hydrazide compound in the dispersed solution is normally between 5 and 70 wt %, preferably 10 and 40 wt %. The concentration of the diluent in the polyoxymethylene consequently rises to make the influence on the fall of the strength and other physical properties unnegligible when the concentration is lower than the above level, whereas the dispersed solution can hardly be added to the molten polyoxymethylene copolymer when the concentration is higher than the above level.

For the purpose of the present invention, the formaldehyde scavenger is added at such a rate that the content of the hydrazide compound contained in the dispersed solution becomes equal to 0.01 to 0.5 parts by weight, preferably 0.02 to 0.4 parts by weight, more preferably 0.03 to 0.3 parts by weight, based upon 100 parts by weight of the polyoxymethylene copolymer. The formaldehyde scavenging effect is not sufficient when the content ratio of the hydrazide compound is less than 0.01 parts by weight, whereas the mold deposit remarkably increases and the process becomes economically disadvantageous when the content ratio of the hydrazide compound exceeds 0.5 parts by weight.

EXAMPLES

Now, the present invention will be described further below by way of examples and comparative examples, although the present invention is by no means limited thereto. The technical terms and the measuring methods in the description of the examples are firstly described below.

(1) M Value (Weight Reduction Ratio by Heating)

This indicates the weight reduction ratio when 2 g of the specimen was put into a test tube and, after replacing the atmosphere with nitrogen, heated at 222° C. for 2 hours under reduced pressure of 10 Torr. The thermal stability is high when the M value is low. When the specimen was a crude polyoxymethylene copolymer, 4.0 wt % of a stabilizer (triethyleneglycol-bis[3-(3-t-butyl-5-methyl-4-hydroxyphenyl) propionate] (available from Chiba-Geigy, tradename: ILGANOX 245) was added to 2 g of powdered crude polyoxymethylene copolymer obtained by drying at 60° C. for 24 hours under reduced pressure of $10^{-2}$ Torr and making to pass through a 60-mesh sieve and mixed well and then the mixture was processed in a similar manner.

(2) Amount of Formaldehyde Generated from Molded Product

A flat plate having dimensions of 100 mm×40 mm×2 mm (thickness) molded by means of a PS-40E5ASE molding machine available from Nissei Plastic Industrial Co., Ltd. at a cylinder temperature of 215° C. was used as a test piece. On the next day, the amount of the generated formaldehyde was measured by way of a process according to the method defined in the German Automobile Manufactures Association Standard VDA275 (Automobile Interior Parts—The determination of the emission of formaldehyde by the revised flask method), following the sequence listed below.

(i) 50 ml of distilled water was put into a polyethylene vessel, which was then closed by a lid while the test piece was being suspended in the vessel and held in a hermetically closed state at 60° C. for 3 hours.

(ii) Subsequently, the polyethylene vessel was left at room temperature for 60 minutes and then the test piece was taken out from the vessel.

(iii) The concentration of the formaldehyde absorbed by the distilled water in the polyethylene vessel was measured by means of an acetyl acetone color metric method, using a UV spectrometer.

(3) Yellowing

The obtained pellets were visually observed to see if they are colored to yellow or not.

(4) Metal Mold Contamination

A Minimat M8/7A molding machine available from Sumitomo Heavy Industries Ltd. and drip type metal molds were used for continuous molding of 500 shots at a molding temperature of 230° C. and a metal mold temperature of 35° C. After the end of the molding operation, the adhered substance (mold deposit) of each metal mold was observed and the metal molds were evaluated by means of a six-grade standard of evaluation (grades 1, 2, 3, 4, 5 and 6), where a low score is given to less contaminated metal molds and a high score is given to more contaminated metal molds.

Example 1

100 parts by weight of trioxane, 4 parts by weight of 1,3-dioxolane, boron trifluoride diethyletherate in the form of benzene solution (6.2 mol/kg-benzene) by 0.05 mmol based upon 1 mol of trioxane as a catalyst, and methylal in the form of benzene solution (25 wt %) as a molecular weight adjusting agent so as to show a concentration of 500 ppm based upon the trioxane were put successively into a biaxial continuous polymerizer having a self-cleaning type paddle and a jacket whose temperature was set to 60° C. and a continuous polymerization process was conducted to make the sojourn time equal to 15 minutes.

Then, triphenylphosphine in the form of benzene solution (25 wt %) was added to the produced polymer by 2 mols based upon 1 mol of the used boron trifluoride diethyletherate and, after the catalyst is deactivated, the mixture was crushed to obtain crude polyoxymethylene copolymer. The yield of the polymer was 98%. The melt index (MI) was 10.5 g/10 min.

0.3 parts by weight of triethyleneglycol-bis[3-(3-t-butyl-5-methyl-4-hydroxyphenyl)propionate] (available from Chiba-Geigy, tradename: IRGANOX 245) and 0.05 parts by weight of melamine were added as antioxidant to 100 parts by weight of the obtained crude polyoxymethylene copolymer and preliminarily mixed by means of a Henschel mixer.

The polyoxymethylene copolymer that was subjected to the preliminary mixing was then introduced into a co-rotating biaxial extruder equipped with vents by way a hopper having an automatic quantification/feed function. Then, the polyoxymethylene copolymer was molten and continuously fed into a horizontal self-cleaning type biaxial kneader in such a way that it shows a sojourn time of 25 minutes in the kneader and devolatilization under reduced pressure was conducted at 200° C. under reduced pressure of 20 kPa. Subsequently, dodecanedioic acid dihydrazide (available from Japan Hydradine Company Inc., melting point: 185° C., decomposition temperature: 252° C.) was slurried in polyethylene glycol (PEG6000P: tradename, available from Sanyo Chemical Industries, Ltd., molecular weight: 6,000) that was molten at 80° C. to show a concentration of 30 wt % and then added to the molten polyoxymethylene copolymer flowing from the horizontal self-cleaning type biaxial kneader into a pelletizer until 100 parts by weight of the polyoxymethylene copolymer came to contain 0.08 parts by weight of dodecanedioic acid dihydrazide. Thus, the polyoxymethylene copolymer was pelletized and prepared as a sample. Table 1 below summarily shows the obtained results.

Example 2

The process of Example 1 was followed except that molten polyoxymethylene copolymer was continuously supplied to make the sojourn time equal to 10 minutes in the horizontal self-cleaning type biaxial kneader. Table 1 below summarily shows the obtained results.

Comparative Example 1

The process of Example 1 was followed except that the powder of dodecanedioic acid dihydrazide was used alone and that it was added to and preliminarily mixed with crude polyoxymethylene copolymer along with the other additives, wherein no dispersed solution of polyethylene glycol containing dodecanedioic acid dihydrazide was added at all thereafter. Table 1 below summarily shows the obtained results.

Comparative Example 2

The process of Example 1 was followed except that polyoxymethylene copolymer subjected to a preliminary mixing as in Example 1 was introduced into a co-rotating biaxial extruder equipped with vents by way a hopper having an automatic quantification/feed function and molten and that subsequently powder of dodecanedioic acid dihydrazide was added alone to the polyoxymethylene copolymer before introducing the molten polyoxymethylene copolymer into a horizontal self-cleaning type biaxial kneader. In other words, no dispersed solution of polyethylene glycol containing dodecanedioic acid dihydrazide was used at all thereafter. Table 1 below summarily shows the obtained results.

Comparative Example 3

The process of Example 1 was followed except that polyoxymethylene copolymer subjected to a preliminary mixing as in Example 1 was introduced into a co-rotating biaxial extruder equipped with vents by way a hopper having an automatic quantification/feed function and molten and that subsequently a dispersed solution of polyethylene glycol containing dodecanedioic acid dihydrazide same as that of Example 1 was added to the polyoxymethylene copolymer before introducing the molten polyoxymethylene copolymer into a horizontal self-cleaning type biaxial kneader. In other words, no dispersed solution of polyethylene glycol containing dodecanedioic acid dihydrazide was added at all thereafter. Table 1 below summarily shows the obtained results.

Comparative Example 4

The process of Example 1 was followed except that no dispersed solution of polyethylene glycol containing dodecanedioic acid dihydrazide was used but dodecanedioic acid dihydrazide was molten by heating it to 200° C. that is higher than the melting point thereof and added to the molten polyoxymethylene copolymer flowing into a pelletizer from a horizontal self-cleaning type biaxial kneader by means a gear pump without using any diluent. Table 1 below summarily shows the obtained results.

Comparative Example 5

The process of Example 1 was followed except that dodecanedioic acid dihydrazide was not added. Table 1 below summarily shows the obtained results.

TABLE 1

|  |  | Example 1 | Example 2 | Comp. Ex. 1 | Comp. Ex. 2 | Comp. Ex. 3 | Comp. Ex. 4 | Comp. Ex. 5 |
| --- | --- | --- | --- | --- | --- | --- | --- | --- |
| polyoxymethylene copolymer | parts by weight | 100 | 100 | 100 | 100 | 100 | 100 | 100 |
| M value of (crude) polyoxymethylene copolymer at position for adding hydrazide compound | % | 0.3 | 0.5 | 2.0 | 1.0 | 1.0 | 0.3 | — |
| rate of generation of formaldehyde from molded product | μg/g-POM | 0.5 | 0.9 | 2.8 | 2.5 | 2.5 | 1.8 | 3.0 |
| yellowing |  | — | none | none | yellowing | yellowing | yellowing | none | none |
| metal mold contamination |  | — | 1 | 1 | 1 | 1 | 1 | 1 | 1 |

INDUSTRIAL APPLICABILITY

The process for producing polyoxymethylene copolymer according to the present invention can suppress any waste of hydrazide compounds and optimize the amount of addition thereof by using a very small quantity. Thus, the generation of formaldehyde is suppressed in the molding process and it is possible to efficiently and economically produce a polyoxymethylene copolymer that is substantially free from mold deposits. Particularly, according to the method of the present invention, a gear pump is arranged downstream of the conventional process and a hydrazide compound (a formaldehyde scavenger) is added not at the time of pellet kneading (off-line addition) but in the form of a slurry solution. Thus, an extrusion process can be omitted once to a great economic advantage.

The invention claimed is:

1. A process for continuously producing a polyoxymethylene copolymer comprising a step of melt-kneading a crude polyoxymethylene copolymer at a temperature not lower than the melting point thereof, devolatilizing under reduced pressure formaldehyde gas generated as a decomposition product, subsequently mixing a formaldehyde scavenger containing a hydrazide compound (A) while keeping the copolymer in a molten state and immediately pelletizing the mixture, characterized in that said formaldehyde scavenger is a dispersed solution obtained by slurry-dispersing said (A) in a diluent (B) having a melting point lower than temperature (Ta) within a temperature range not lower than the melting point of (B) and lower than (Ta), wherein said (Ta) is the lower one of the melting point and the decomposition temperature of (A).

2. The process according to claim 1, characterized in that a horizontal self-cleaning type biaxial kneader is employed for the step of devolatilizing under reduced pressure and devolatilization is conducted for 15 to 60 minutes.

3. The process according to claim 1, characterized in that the hydrazide compound (A) is dihydrazide compound.

4. The process according to claim 3, characterized in that the dihydrazide compound is at least a compound selected from a group consisting of adipoyl dihydrazide, sebacic dihydrazide, dodecanedioic acid dihydrazide, 1,18-octadecanedicarbohydrazide, terephthalic acid dihydrazide, 1,8-naphthalene dicarbohydrazide and 2,6-naphthalene dicarbohydrazide.

5. The process according to claim 1, characterized in that the diluent (B) is polyethylene glycol.

6. The process according to claim 5, characterized in that the diluent (B) is polyethylene glycol having a molecular weight between 1,000 and 50,000 as determined from the hydroxy value.

7. The process according to claim 1, characterized in that the concentration of the hydrazide compound in the dispersed solution is between 5 and 70 wt %.

\* \* \* \* \*